2,918,384
PREPARATION OF CERAMIC FRIT COMPOSITIONS

Malcolm D. Beals, Fanwood, N.J., and Edward A. Giess, Wappingers Falls, N.Y., assignors to National Lead Company, New York, N.Y., a corporation of New Jersey No Drawing. Application January 12, 1959
Serial No. 786,013

6 Claims. (Cl. 106—49)

This invention relates to a ceramic frit composition. More specifically, this invention relates to a frit composition from which a ceramic glaze, opacified and whitened with $TiO_2$ may be prepared. In particular, this invention relates especially to a frit composition of the alkali, alkaline earth, alumino-silicate type from which is obtained an opacified titanium-containing glaze.

This application is a continuation-in-part of our co-pending application, Serial No. 601,131, filed July 31, 1956, and now abandoned.

To be useful in the coating of ceramic bodies, a glaze must exhibit certain properties. It is necessary, first of all, for the glaze to have a coefficient of thermal expansion similar to that of the substrate ceramic material; otherwise undue stresses will be set up during the cooling of the fired piece resulting in spalling, cracking, chipping or crazing. Aside from the necessary limitations on the coefficient of expansion, other properties are desirable in a decorative glaze. Among these may be mentioned high opacity, gloss, durability at moderate maturing temperature, and purity of color. Particularly in the case of a white glaze, a pure white color is to be desired. Such a base color lends itself readily to the production, if desired, of pastel shades by the addition of minor amounts of tinting agents to the formulation.

It is, therefore, an object of the present invention to provide a frit composition from which an improved ceramic glaze can be produced. It is a further object to provide a frit composition from which a ceramic glaze having a coefficient of expansion comparable to the coefficient of expansion of the ceramic material to which it is applied, may be obtained. An additional object is to obtain a frit composition from which a durable white ceramic glaze of high opacity may be obtained. These and other objects will become apparent from the more complete description of the instant invention.

In its broadest aspects, this invention contemplates a frit composition adaptable for preparation of self-opacified ceramic glazes consisting essentially of $SiO_2$ in amount from about 50 to about 68 mole percent, $Al_2O_3$ in amount from about 4 to about 12 mole percent, $TiO_2$ in amount from about 6 to about 18 mole percent, $ZrO_2$ in amount from 0 to 6 mole percent, alkali metal oxide selected from the group consisting of $Na_2O$ and $K_2O$, said alkali metal oxide in amount from about 4 to about 18 mole percent in which the $Na_2O$ is present in amount of at least about 3 mole percent, alkaline earth metal oxide selected from the group consisting of CaO, MgO and SrO, said alkaline earth metal oxide in amount from about 5 to about 15 mole percent.

A desirable embodiment of the instant invention contemplates a frit composition of the above type in which other oxides are present in the composition in place of a portion of the alkaline earth metal oxides in said composition. The other oxides which may be substituted for a portion of the alkaline earth metal oxide selected from the group consisting of CaO, MgO and SrO are barium oxide, lead oxide, cadmium oxide and zinc oxide. These and other oxides may be replaced on a mole basis up to ⅓ of the alkaline earth metal oxide in the composition.

It is also desirable in some instances to add, in addition to the above compositions, fluorine in an amount up to 6 mole percent. $P_2O_5$ may also be added if desired in amount up to 4 mole percent. Lithium oxide may also be substituted for the sodium oxide in amount up to ⅓ of the sodium oxide on a mole basis.

These frits which have the compositions as described may be used to produce ceramic glazes which are of commercial value. The ceramic glazes prepared from such frits may be applied to common ceramic materials such as wall tile, terra cota, earthenware and structural clay bodies. These compositions mature at temperatures in the neighborhood of 950–1200° C. to produce highly opaque durable white glazes. These glazes are of the "recrystallizing" type by which is meant that they are pigmented by precipitation during the maturing heat of titania originally present as a melted-in constituent of the frit. The titanium values usually precipitate in these compositions as titanates and titanosilicates.

They may be applied by preparing a frit having a composition within the ranges above specified, fusing the batch to provide complete intersolution, quenching in water and milling. The milled frit, usually with the addition of small amounts of clay and electrolytes, is applied to the ceramic substrate in any ordinary manner such as by dipping, brushing or spraying.

In order to more fully illustrate the instant invention, the following examples are presented.

EXAMPLE 1

A frit composition was prepared by melting together for about one hour, at about 1380° C., a mixture of the following ingredients:

| Ingredient | Parts by wt. |
|---|---|
| Potter's flint | 116.0 |
| Aluminum oxide | 27.2 |
| Sodium carbonate | 31.8 |
| Potassium carbonate | 23.0 |
| Calcium carbonate | 26.7 |
| Titanium dioxide | 32.0 |

The calculated composition of the resulting frit, expressed in mole percentages, was as follows:

| Component: | Mole percent |
|---|---|
| $SiO_2$ | 58.0 |
| $Al_2O_3$ | 8.0 |
| CaO | 8.0 |
| $Na_2O$ | 9.0 |
| $K_2O$ | 5.0 |
| $TiO_2$ | 12.0 |

When complete intersolution was achieved, and the frit composition was clear, the frit was quenched in water.

One hundred parts of this quenched frit were ball-milled for 18 hours along with 4 parts of clay, 0.25 part of $NaNO_2$, 0.25 part of $K_2CO_3$ and 40 parts of demineralized water. The milled frit was then strained through a 200 mesh screen to insure the absence of any coarse particles. The strained slip was well dispersed and of sprayable consistency.

The milled slip was then sprayed onto a bisqued wall tile panel at a dry application weight of about 50 grams per square foot, dried for several hours at 150° C. and then fired under oxidizing conditions (air atmosphere) at 1100° C. The kiln required about seven hours to reach this temperature, and after being held at the maximum temperature for about one-half hour, heating was discontinued and the kiln was allowed to cool overnight.

The resulting glaze was smooth, glossy, continuous and possessed an excellent white color.

EXAMPLES 2–16

Using the same procedure as that described in Example 1, other frit compositions were prepared by mixing various quantities of ingredients to produce frits having a variety of compositions which fall within the ranges contemplated by the instant invention and ceramic glazes were prepared from such frit compositions. The amounts of ingredients employed and the frit compositions obtained along with the smelting and firing temperatures are recorded with the data of Example 1 in Table 1. The same examples expressed in weight percentages are recorded in Table II.

EXAMPLE 17

In this example the same procedure as that described in Example 1 was employed except that smaller amounts of alkali metal oxides and higher amounts of silica were used. In preparing the frit composition the ingredients were melted at 1525° C.

The vitreous glaze produced on the substrate using this frit composition possessed a very high reflectance with an excellent white color. The operational data are recorded in Tables I and II.

Table I
OPERATING DATA OF FRIT COMPOSITIONS

| Ingredients Added | Parts by Weight — Examples | | | | | |
|---|---|---|---|---|---|---|
|  | 1 | 2 | 3 | 4 | 5 | 6 |
| Potter's Flint | 116.0 | 113.0 | 116.0 | 116.0 | 119.0 | 113.0 |
| Aluminum Oxide | 27.2 | 34.0 | 27.2 | 27.2 | 27.2 | 34.0 |
| Sodium Carbonate | 31.8 | 31.1 | 31.8 | 31.8 | 32.5 | 31.1 |
| Potassium Carbonate | 23.0 | 22.6 | 23.0 | 23.0 | 23.5 | 22.6 |
| Calcium Carbonate | 26.7 | 26.1 | 20.0 | 20.0 | 27.4 |  |
| Magnesium Carbonate |  |  | 5.6 |  |  | 21.9 |
| Basic Lead Carbonate (PbCO$_3$)$_2$Pb(OH)$_2$ |  |  |  | 17.2 |  |  |
| Titanium Dioxide | 32.0 | 32.0 | 32.0 | 32.0 | 26.6 | 32.0 |

| Frit Composition | Mole Percents — Examples | | | | | |
|---|---|---|---|---|---|---|
|  | 1 | 2 | 3 | 4 | 5 | 6 |
| SiO$_2$ | 58.0 | 56.5 | 58.0 | 58.0 | 59.5 | 56.5 |
| Al$_2$O$_3$ | 8.0 | 10.0 | 8.0 | 8.0 | 8.0 | 10.0 |
| CaO | 8.0 | 7.8 | 6.0 | 6.0 | 8.2 |  |
| Na$_2$O | 9.0 | 8.8 | 9.0 | 9.0 | 9.2 | 8.8 |
| K$_2$O | 5.0 | 4.9 | 5.0 | 5.0 | 5.1 | 4.9 |
| TiO$_2$ | 12.0 | 12.0 | 12.0 | 12.0 | 10.0 | 12.0 |
| MgO |  |  | 2.0 |  |  | 7.8 |
| PbO |  |  |  | 2.0 |  |  |
| Smelting Temp. (°C.) | 1,380 | 1,430 | 1,380 | 1,410 | 1,440 | 1,400 |
| Firing Temp. (°C.) | 1,100 | 1,100 | 1,100 | 1,050 | 1,100 | 1,100 |

| Ingredients Added | Parts by Weight — Examples | | | | |
|---|---|---|---|---|---|
|  | 7 | 8 | 9 | 10 | 11 |
| Potter's Flint | 122.0 | 111.4 | 116.0 | 116.0 | 116.0 |
| Aluminum Oxide | 20.4 | 26.2 | 20.4 | 27.2 | 27.2 |
| Sodium Carbonate | 33.2 | 16.2 | 17.7 | 31.8 | 31.8 |
| Potassium Carbonate | 24.0 | 22.1 | 23.0 | 23.0 | 23.0 |
| Calcium Carbonate | 28.0 | 25.7 | 46.7 | 20.0 | 20.0 |
| Magnesium Carbonate |  |  |  | 2.8 | 2.8 |
| Barium Carbonate |  |  |  | 6.6 |  |
| Zinc Carbonate |  |  |  |  | 4.2 |
| Sodium Fluoride |  | 11.2 |  |  |  |
| Titanium Dioxide | 26.6 | 30.6 | 32.0 | 32.0 | 32.0 |

Table I—Continued

| Frit Composition | Mole Percents — Examples | | | | |
|---|---|---|---|---|---|
|  | 7 | 8 | 9 | 10 | 11 |
| SiO$_2$ | 61.0 | 55.7 | 58.0 | 58.0 | 58.0 |
| Al$_2$O$_3$ | 6.0 | 7.7 | 6.0 | 8.0 | 8.0 |
| CaO | 8.4 | 7.7 | 14.0 | 6.0 | 6.0 |
| Na$_2$O | 9.4 | 8.6 | 5.0 | 9.0 | 9.0 |
| K$_2$O | 5.2 | 4.8 | 5.0 | 5.0 | 5.0 |
| TiO$_2$ | 10.0 | 11.5 | 12.4 | 12.0 | 12.0 |
| MgO |  |  |  | 1.0 | 1.0 |
| BaO |  |  |  | 1.0 |  |
| ZnO |  |  |  |  | 1.0 |
| F$_2$ |  | 4.0 |  |  |  |
| Smelting Temp. (°C.) | 1,350 | 1,380 | 1,350 | 1,380 | 1,400 |
| Firing Temp. (°C.) | 1,050 | 1,075 | 1,150 | 1,050 | 1,050 |

| Ingredients Added | Parts by Weight — Examples | | | | | |
|---|---|---|---|---|---|---|
|  | 12 | 13 | 14 | 15 | 16 | 17 |
| Potter's Flint | 113.0 | 116.0 | 116.0 | 110.0 | 116.0 | 199.8 |
| Aluminum Oxide | 34.0 | 27.2 | 27.2 | 34.0 | 27.2 | 22.4 |
| Sodium Carbonate | 31.1 | 31.8 | 31.8 | 24.0 | 24.7 | 19.2 |
| Potassium Carbonate | 22.5 | 23.0 | 23.0 | 21.8 | 13.8 | 5.9 |
| Calcium Carbonate |  | 20.0 | 26.7 | 25.3 | 26.7 | 55.0 |
| Strontium Carbonate | 38.4 |  |  |  |  |  |
| Cadmium Oxide |  | 8.5 |  |  |  |  |
| Lithium Carbonate |  |  |  |  | 9.8 | 6.3 |
| Zirconium Oxide |  |  | 24.6 |  |  |  |
| Monobasic Sodium Phosphate |  |  |  | 18.4 |  |  |
| Titanium Dioxide | 32.0 | 32.0 | 16.0 | 32.0 | 32.0 | 35.4 |
| Zinc Carbonate |  |  |  |  |  | 6.3 |

| Frit Composition | Mole Percents — Examples | | | | | |
|---|---|---|---|---|---|---|
|  | 12 | 13 | 14 | 15 | 16 | 17 |
| SiO$_2$ | 56.5 | 58.0 | 58.0 | 55.1 | 58.0 | 68.0 |
| Al$_2$O$_3$ | 10.0 | 8.0 | 8.0 | 10.0 | 8.0 | 4.5 |
| CaO |  | 6.0 | 8.0 | 7.6 | 8.0 | 11.2 |
| Na$_2$O | 8.8 | 9.0 | 9.0 | 8.6 | 7.0 | 3.7 |
| K$_2$O | 4.9 | 5.0 | 5.0 | 4.7 | 3.0 | 0.9 |
| TiO$_2$ | 12.0 | 12.0 | 6.0 | 12.0 | 12.0 | 9.0 |
| SrO | 7.8 |  |  |  |  |  |
| CdO |  | 2.0 |  |  |  |  |
| P$_2$O$_5$ |  |  |  | 2.0 |  |  |
| Li$_2$O |  |  |  |  | 4.0 | 1.7 |
| ZrO$_2$ |  |  | 6.0 |  |  |  |
| ZnO |  |  |  |  |  | 1.0 |
| Smelting Temp. (°C.) | 1,400 | 1,380 | 1,480 | 1,460 | 1,380 | 1,525 |
| Firing Temp. (°C.) | 1,050 | 1,050 | 1,125 | 1,050 | 1,040 | 1,140 |

Table II

| | Weight Percents — Examples | | | | | | | |
|---|---|---|---|---|---|---|---|---|
|  | 1 | 2 | 3 | 4 | 5 | 6 | 7 | 8 |
| SiO$_2$ | 51.7 | 49.8 | 52.0 | 49.3 | 53.3 | 50.7 | 55.4 | 50.5 |
| Al$_2$O$_3$ | 12.1 | 14.9 | 12.2 | 11.5 | 12.2 | 15.2 | 9.2 | 11.9 |
| CaO | 6.7 | 6.4 | 5.0 | 4.7 | 6.9 |  | 7.1 | 6.5 |
| Na$_2$O | 8.3 | 8.0 | 8.3 | 7.9 | 8.5 | 8.2 | 8.8 | 8.1 |
| K$_2$O | 7.0 | 6.8 | 7.0 | 6.7 | 7.2 | 6.9 | 7.4 | 6.8 |
| TiO$_2$ | 14.2 | 14.1 | 14.3 | 13.6 | 11.9 | 14.3 | 12.1 | 13.9 |
| MgO |  |  | 1.2 |  |  | 4.7 |  |  |
| PbO |  |  |  | 6.3 |  |  |  |  |
| F$_2$ |  |  |  |  |  |  |  | 2.3 |

Table II—Continued

| Frit Comp. | Weight Percents — Examples | | | | | | | | |
|---|---|---|---|---|---|---|---|---|---|
| | 9 | 10 | 11 | 12 | 13 | 14 | 15 | 16 | 17 |
| $SiO_2$ | 52.6 | 51.1 | 51.7 | 47.2 | 50.6 | 49.8 | 47.4 | 53.2 | 64.5 |
| $Al_2O_3$ | 9.2 | 12.0 | 12.1 | 12.2 | 11.9 | 11.7 | 14.6 | 12.5 | 7.3 |
| $CaO$ | 11.9 | 4.9 | 5.0 | | 4.9 | 6.4 | 6.1 | 6.9 | 9.9 |
| $Na_2O$ | 4.7 | 8.2 | 8.2 | 7.6 | 8.1 | 8.0 | 7.6 | 6.6 | 3.6 |
| $K_2O$ | 7.1 | 6.9 | 7.0 | 6.4 | 6.9 | 6.7 | 6.4 | 4.3 | 1.3 |
| $TiO_2$ | 14.5 | 14.1 | 14.2 | 13.3 | 13.9 | 6.8 | 13.8 | 14.7 | 11.3 |
| $MgO$ | | .6 | .6 | | | | | | |
| $BaO$ | | 2.2 | | | | | | | |
| $ZnO$ | | | 1.2 | | | | | | 1.3 |
| $SrO$ | | | | 11.3 | | | | | |
| $CdO$ | | | | | 3.7 | | | | |
| $P_2O_5$ | | | | | | | 4.1 | | |
| $Li_2O$ | | | | | | | | 1.8 | .8 |
| $ZrO_2$ | | | | | | 10.6 | | | |

In all of these examples the composition of the frit has been varied to show specific examples which fall within the ranges of composition which are contemplated by the instant invention. In these examples various glazes were produced from all of the frits produced and in every case the ceramic glazes produced were smooth, glossy and continuous and possessed an excellent white color.

From the above description and by the examples presented, frit compositions of various compositions have been produced and ceramic glazes have been prepared from such frit compositions. The glazes produced have an excellent white color. They are durable, possess high gloss, are highly opacified and have coefficient of expansion which are useful for a variety of ceramic materials. The ceramic glazes produced possess pure white colors and such glazes render themselves readily as base glazes for the production of pastels by the addition of minor amounts of tinting agents to the formulation.

While this invention has been described and illustrated by the examples shown, it is not intended to be strictly limited thereto, and other modifications and variations may be employed within the scope of the following claims.

We claim:

1. A frit composition adaptable for preparation of self-opacified ceramic glazes consisting essentially of $SiO_2$ in amount from about 50 to about 68 mole percent, $Al_2O_3$ in amount from about 4 to about 12 mole percent, $TiO_2$ in amount from about 6 to about 18 mole percent, $ZrO_2$ in amount from 0 to 6 mole percent, alkali metal oxide selected from the group consisting of $Na_2O$ and $K_2O$, said alkali metal oxide in amount from about 4 to about 18 mole percent in which the $Na_2O$ is present in amount of at least about 3 mole percent, alkaline earth metal oxide selected from the group consisting of CaO, MgO and SrO, said alkaline earth metal oxide in amount from about 5 to about 15 mole percent.

2. Composition according to claim 1 in which a compound selected from the group consisting of BaO, PbO, CdO and ZnO is also present in said mixture, said compound replacing on a mole basis up to one-third of the alkaline earth metal oxide in said composition.

3. Composition according to claim 1 in which said composition also contains F in amounts up to 6 mole percent.

4. Composition according to claim 1 in which said composition also contains $P_2O_5$ in amounts up to 4 mole percent.

5. Composition according to claim 1 in which said composition also contains $Li_2O$, said compound replacing on a mole basis up to ⅓ of the sodium oxide.

6. Composition according to claim 1 in which PbO is also present in said mixture, said PbO replacing on a mole basis up to one-third of the alkaline earth metal oxide in said composition.

References Cited in the file of this patent

UNITED STATES PATENTS

| | | |
|---|---|---|
| 2,483,393 | Baldwin | Oct. 4, 1949 |
| 2,498,912 | Claudet | Feb. 28, 1950 |
| 2,556,896 | Beatty et al. | June 12, 1951 |

FOREIGN PATENTS

| | | |
|---|---|---|
| 901,258 | France | Oct. 30, 1944 |